Patented Apr. 4, 1939

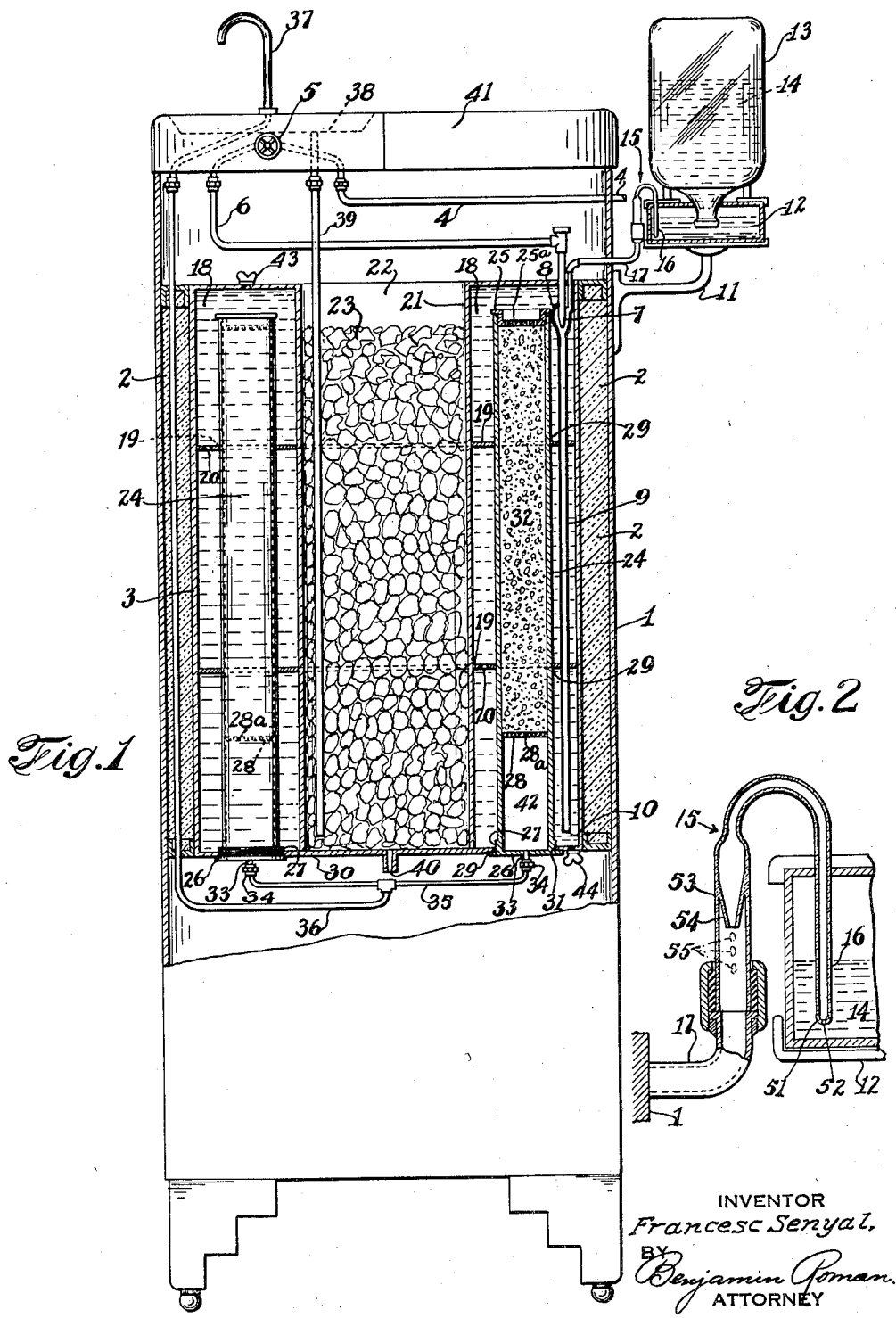

2,153,345

UNITED STATES PATENT OFFICE 2,153,345

WATER STERILIZING APPARATUS

Francesc Senyal, New York, N. Y.

Application July 16, 1938, Serial No. 219,491

6 Claims. (Cl. 210—28)

This invention relates to an apparatus for sterilizing, purifying, and cooling water, which apparatus is intended for homes and public buildings that are located in territory wherein the natural water is infected with detrimental substance or living matter.

The principal object of my invention is to provide an efficient, reliable, practicable, and improved apparatus for the above purpose, which will be simple, strong, durable, completely automatic, require little care, free from getting out of order or requiring undue repairs, conveniently and economically manufacturable, and salable at low cost.

Another object is to provide the above mentioned apparatus with a siphoning device for its sterilizing liquid, which device will have efficient and improved means for preventing sedimentary clogging thereof and for positive indication of its functioning.

Other objects and advantages will hereinafter appear.

In the accompanying drawing—

The Figure 1 represents a vertically longitudinal cross-section of the water sterilizing apparatus of the invention.

Fig. 2 is a vertically longitudinal cross-sectional elevation, in an enlarged scale, of the siphoning device of this apparatus.

Within a cabinet 1, equipped with insulation walls 2, is mounted a tank 3 constituting a reservoir for water. A supply pipe 4 carrying water under service pressure leads to a faucet valve 5 located conveniently near the top of the cabinet, and from said valve a pipe 6 conducts the water to and into the upper part of the tank 3, wherein it terminates in a nozzle 7 located within a chamber 8, wherefrom a pipe 9 conducts the water to the bottom of the tank at 10. To the exterior of cabinet 1 is secured a bracket 11 that carries a vessel 12 over which is mounted in the manner shown an inverted jar 13 containing liquid 14, that may be chlorinated or otherwise charged or impregnated with any suitable sterilizing material for the elimination or destruction of deleterious substances and living matter residing in the service water. A siphon 15 having its receiving end 16 submerged in vessel 12 is connected to a tube 17, which leads into the tank 3 and is connected to the chamber 8. The tank 3 is divided into a series of horizontal compartments 18, separated by level walls 19; each of which is provided with a small orifice 20. In the middle of tank 3 is located an inner tank 21, which is preferably open at the top 22 thereof, and as here shown is filled with cracked ice 23, but which may also contain any other suitable freezing mixture, "dry" ice, or the freezing coils of a refrigerating machine. At the sides of ice tank 21 and within the tank 3 are located cylindrical shells 24, each of which has its top closed by a removable perforated cap 25, its bottom sealed by a flange 26 having a threaded shoulder 27, and provided with a perforated partition 28. Each of the shells 24 is placeable within the tank 3 in the operative position shown and is removable therefrom by being passed through registering openings 29 in the walls 30, 19 and threading its flange 26 in a tapped rim 31 of opening 29 of the bottom wall 30. The interior of each shell 24 is filled with carbon, charcoal, or any other suitable water-filtering material 32. Each flange 26 is provided with an outlet 33 which is joined by a coupling 34 to a pipe 35, and the pipes 35 from said shells are connected to a common pipe 36 that leads as shown to the top of the cabinet where it is connected to a consumption outlet or fountain 37 located at an elevation which is considerably above that of the siphon 15. The fountain 37 is positioned over a draining pan or basin 38, from which a drain pipe 39 conducts the waste and extends downwardly through and to the bottom of the ice tank 21, which is in turn drained through an outlet 40. Adjacent to the drain 38 the cabinet 1 is provided with a removable cover 41, for gaining convenient access to the interior tank 21 for loading thereinto the ice 23. The chamber 42 between the bottom 30 of tank and the floor 43 of the cabinet 1 may be availed of for installation of automatic refrigerating machinery operated by heat or electricity, wherever practicable, for servicing refrigerating coils in the tank 21.

The submerged operative terminal 51 of siphon 15, Fig. 2, is substantially closed as shown, leaving but a very small opening 52 for passage of the liquid 14 therethrough, while the exterior arm 53 is provided with a usual nozzle 54. By virtue of the elements 51, 52 the sterilizing liquid 14 is caused to be sucked up and delivered from the nozzle 54 in the form of visible drops 55, instead of an invisible minute stream of the liquid, as occurred heretofore. Also, sedimentary clogging of the orifice of nozzle 54 is prevented, because any sediment occurring in the liquid 14 is intercepted by the closed terminal 51 and arrested by the minute opening 52, which is however constantly swept clear by the frequent back-suction in the siphon produced upon the closing of valve 5.

In operation, service water from mains under pressure is fed through pipe 4, valve 5, pipe 6, to nozzle 7, wherefrom the water issuing with force creates a suction in the chamber 8, which suction draws, from and through tube 17 and siphon 15, requisite quantities of sterilizing liquid 14 in the vessel 12 fed by the reservoir 13. The water and liquid 14 becoming thus thoroughly and properly admixed in the chamber 8 issue therefrom as charged water through pipe 9 into the lowermost compartment 18 of the tank 1, which water in turn passes into the middle compartment through orifice 20 and through the upper orifice 20 into the top compartment 18. From said compartment the water passes through the perforations 25a of covers 25 and into the carbon-laden shells 24, wherein the filtering material 32 extracts any foreign matter or impurities in the water and absorbs the sterilizing fluid in the charged water. The water then passes on through perforations 28a of partitions 28 into lower reservoirs 42 of the shells 24, wherefrom it flows through pipes 35, 36 to the fountain outlet 37. In its passage through the reservoir tank 1 the water becomes cool for pleasant drinking purposes by contact with the chilled walls 21 of the ice tank. The function of separation of the tank 1 into the compartments 18 by the level walls 19, and provision of the small orifices 20 in the latter, is to hold back and reduce the pressure of the service water before its entry into the shells 4, for the proper and efficient filtering action of the material 32. For the same purpose the provision of reservoirs 42 serves to maintain at all times a requisite supply of fully sterilized, filtered, and cooled water for feeding through the pipes 35, 36 to the fountain for consumption. The upper wall of the tank 1 is provided with a screw-cap 43 for letting out the air from the reservoir tank when it is first filled with water in the preparation of the apparatus for use. During normal use of the apparatus, the valve 5 is opened for drawing required water from the fountain, and during the interval of said opening an equal supply of water is fed from the service mains into the apparatus, wherein it performs its above described circuit therethrough.

The particular mode of operation of the siphoning device 15 maintains the latter free of sedimentary clogging and in efficiently functioning condition, which is at all times in evidence by the visibly issuing drops 55 of the sterilizing liquid, at all times clearly seen through the glass composing the arm 53, and thereby assuring the user that the sterilizing apparatus is performing its duty, while correspondingly warning of accidental failure of proper operation.

The reservoir tank may be occasionally cleansed of sediment, by letting its water out through a drain plug 44 that screws into its bottom wall 30. In order to change or renew the carbon filtering material in the shells 24, the latter may be entirely removed from the tank 1 by separating the coupling 34, unthreading its flange 26, and then withdrawing the shell downwardly out of the tank through the opening 29, after which the cover 25 may be removed for gaining access into the shell.

The substantial elevation of the outlet of the fountain 37 above that of the siphon 15 conduces toward proper and efficient operation of the latter, to in turn effect a requisite admixing of the sterilizing fluid with the incoming water for properly charging the latter. And the provision of the compartments 19 and the small orifices 20, that are oppositely disposed as illustrated, serving to check the pressure of the inflowing water to the filtering material 32 aids greatly in thorough admixture of the sterilizing fluid with the water, as well as in the requisite extraction of the former from the latter.

Variations may be resorted to within the scope of the invention, and portions of the improvements may be used without others.

Having thus described my invention, I claim:

1. A water sterilizing apparatus having the combination of a water reservoir tank, a water pressure service pipe leading to and into said tank, a valve for said pipe, a vessel containing sterilizing fluid, means for producing admixture of the water from said pipe and said fluid upon the opening of said valve, a pipe leading from said admixing means to and into the bottom of said tank, said tank divided into upper and lower compartments by a horizontal wall having a limited opening, a tank containing cooling means located within said water tank, a tank containing filtering material located within said water tank in both of its said compartments and extending through said wall, said last tank having a perforated area for admitting thereinto water from said water tank and a perforated area for outletting the water, a pipe leading from said filtering material tank to a consumption outlet, and said outlet situated above the inlet of said sterilizing fluid to said admixing means.

2. A water sterilizing apparatus having the combination of a water reservoir tank, a water pressure service pipe leading to and into said tank, a valve for said pipe, a vessel containing sterilizing fluid, means for producing admixture of the water from said pipe and said fluid upon the opening of said valve, a pipe leading from said admixing means to and into the bottom of said tank, said tank divided into upper and lower compartments by a horizontal wall having a limited opening, a tank containing filtering material located within said water tank in both of its said compartments and extending through said wall, said last tank having a perforated area for admitting thereinto water from said water tank and a perforated area for outletting the water, a pipe leading from said filtering material tank to a consumption outlet, and said outlet situated above the inlet of said sterilizing fluid to said admixing means.

3. A water sterilizing apparatus having the combination of a water reservoir tank, a water pressure service pipe leading to and into said tank, a valve for said pipe, a vessel containing sterilizing fluid, means for producing admixture of the water from said pipe and said fluid upon the opening of said valve, a pipe leading from said admixing means to and into the bottom of said tank, said tank divided into upper and lower compartments by a horizontal wall having a limited opening, a tank containing filtering material located within said water tank in both of its said compartments and extending through said wall, said last tank having a perforated area for admitting thereinto water from said water tank and a perforated area for outletting the water, and a pipe leading from said filtering material tank to a consumption outlet.

4. A water sterilizing apparatus having the combination of a water reservoir tank, a water pressure service pipe leading to and into said tank, a valve for said pipe, a vessel containing sterilizing fluid, means for producing admixture of the water from said pipe and said fluid upon the opening of said valve, a pipe leading from said admixing means to and into the bottom of said tank, a tank containing filtering material located within said water tank, said last tank having a perforated area for admitting thereinto water from said water tank and a perforated area for outletting the water, a pipe leading from said filtering material tank to a consumption outlet, and said outlet situated above the inlet of said sterilizing fluid to said admixing means.

5. A water sterilizing apparatus having the combination of a water reservoir tank, a water pressure service pipe leading to and into said tank, a valve for said pipe, a vessel containing sterilizing fluid, means for producing admixture of the water from said pipe and said fluid upon the opening of said valve, a pipe leading from said admixing means into said tank, a tank containing filtering material located within said water tank, said last tank having a perforated area for admitting thereinto water from said water tank and a perforated area for outletting the water, a pipe leading from said filtering material tank to a consumption outlet, and said outlet situated above the inlet of said sterilizing fluid to said admixing means.

6. A water sterilizing apparatus having the combination of a water reservoir tank, a water pressure service pipe leading to and into said tank, a valve for said pipe, a vessel containing sterilizing fluid, means for producing admixture of the water from said pipe and said fluid upon the opening of said valve, a pipe leading from said admixing means into said tank, a tank containing cooling means located within said water tank, a tank containing filtering material located within said water tank, said last tank having a perforated area for admitting thereinto water from said water tank and a perforated area for outletting the water, a pipe leading from said filtering material tank to a consumption outlet, and said outlet situated above the inlet of said sterilizing fluid to said admixing means.

FRANCESC SENYAL.